Nov. 5, 1957  A. S. JACKSON  2,811,742
POULTRY SPLITTING MACHINE
Filed Dec. 9, 1955  2 Sheets-Sheet 1

INVENTOR.
ALEX S. JACKSON
BY John P. Chandler
HIS ATTORNEY.

Nov. 5, 1957 — A. S. JACKSON — 2,811,742
POULTRY SPLITTING MACHINE
Filed Dec. 9, 1955 — 2 Sheets-Sheet 2

INVENTOR.
ALEX JACKSON
BY John P. Chandle
HIS ATTORNEY.

2,811,742
POULTRY SPLITTING MACHINE

Alex S. Jackson, Duluth, Minn.

Application December 9, 1955, Serial No. 552,213

8 Claims. (Cl. 17—11)

This invention relates to machines for dressing fowl and other birds and animals and has for its principal object the provision of a rotary cutter in combination with a pendulous, boat-shaped work holder having a slot for the rotary cutter, the work holder being mounted for arcuate movement in such a manner that the rotary cutter makes a longitudinal cut of predetermined depth directly through the center of the back without puncturing or incising the viscera.

The machine of the present invention is designed primarily for young fowl or broilers and the machine makes a neat central incision in the back from the neck to the tail in order that the fowl may be opened to permit evisceration with little effort and in a minimum amount of time. After the evisceration the broiler may be completely halved in a single stroke of a knife or other cutter and the chicken is ready for the pan.

An important object of the invention is to provide a novel machine including a slotted, pendulous work holder and saw which prevents lateral movement of the work during cutting and assures against uneven halves.

Another object of the invention is to provide a rotary cutter wherein maximum safety is assured and wherein full control by the operator is possible at all times.

The popularity of the halved broiled chicken has made it necessary to improve the technique of preparing the same and the cutting machine of the present invention is designed to simplify the process. After the feathers have been removed and the head and feet severed the chicken is ready to be operated on by the machine of the present invention. The chicken is placed within the pendulous work holder which has means for easy centering of the chicken, and a longitudinally slotted lower wall shaped generally similar to the contour of the back of the chicken.

A circular rotary cutter may be operating continuously or intermittently under the control of the operator. The work holder is then swung through an arc and the chicken is cut from back to front. Operations of this character are generally done in a production line and after the splitting operation has been performed by the machine of the present invention the next step consists in cutting through the wishbone with a knife and then grasping each side of the carcass with one hand and by moving the hands away from each other the halves are separated and the carcass opened flat for easy and proper removal of the viscera.

Figure 1:
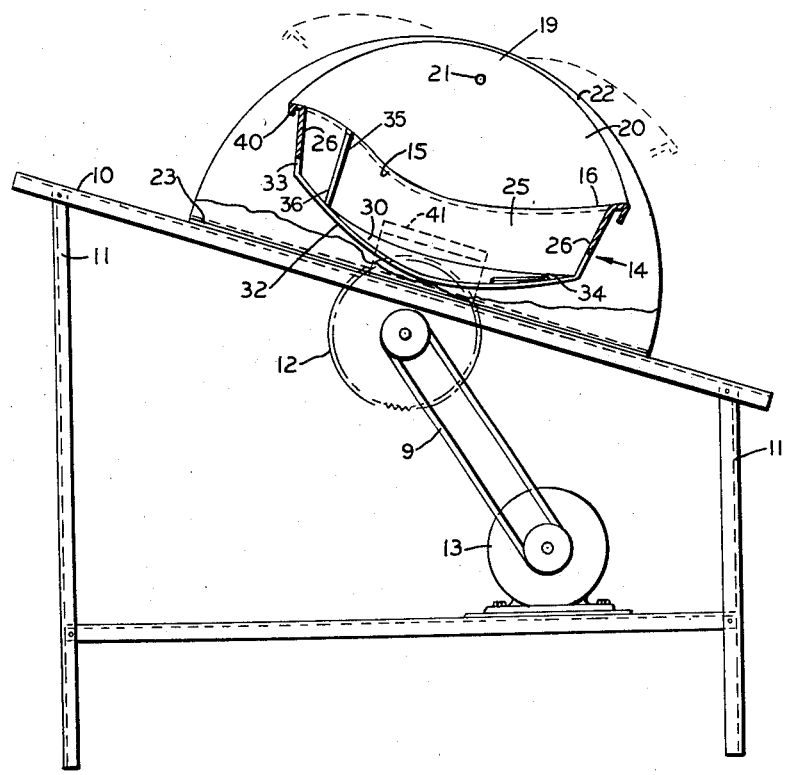
Fig. 1 is a side elevation partially in section of the poultry splitting device of the present invention, the part in section being taken on line 1—1 of Fig. 2.
Figure 2:
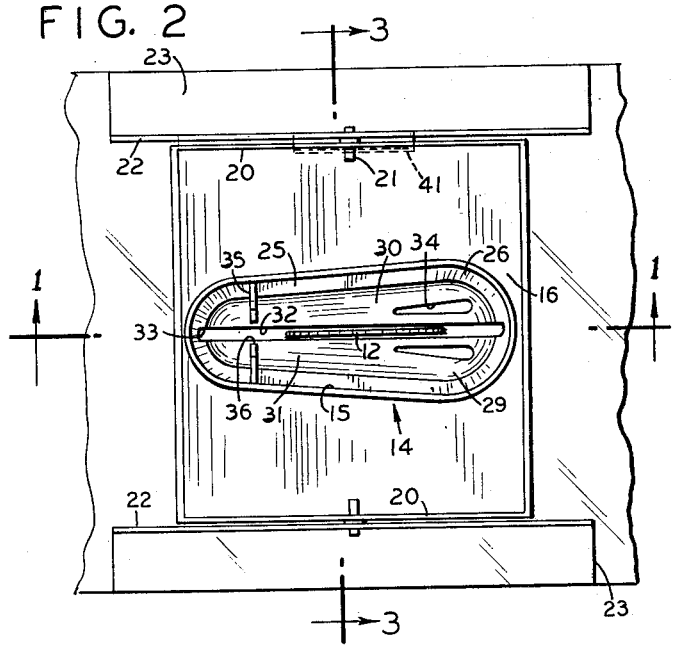
Fig. 2 is a broken plan view thereof.
Figure 3:
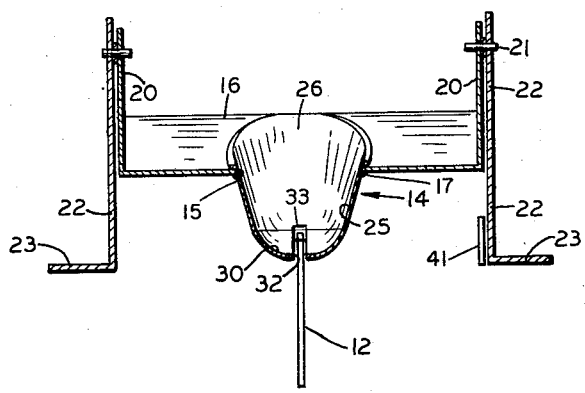
Fig. 3 is a section showing the upper portion of the apparatus, the section being taken on line 3—3 of Fig. 2.

The poultry cutter of the present invention is mounted on a frame which may comprise a table top 10 which is inclined upwardly away from the operator who stands at the right end of the machine when viewed as in Fig. 1. The table top is mounted on legs 11 and a rotary saw blade 12 having a peripheral cutting edge or cutting teeth is suitably mounted below the table top and is driven by a motor 13 having a belt connection 9 to the cutter.

The article, such as a broiler (not shown), to be operated upon by the cutting device of the present invention is placed within a shallow boat-shaped work holder 14 which is formed of metal or other sheet material and the work holder is mounted along its upper marginal edge, as by welding shown at 17, within a suitably shaped opening 15 formed in a supporting plate 16 which has upwardly turned ears or side plates 20 on opposite sides thereof.

The ears which are the supports for the work holder are pivotally mounted at 21 adjacent their upper ends between a pair of supporting brackets 22 having angular flanges 23 secured to the table top 10.

The boat-like work holder includes a continuous ring-like wall having non-parallel side wall portions 25 and curved end wall portions 26. The lower wall is formed in two spaced, opposed longitudinally disposed sections 30 and 31 leaving a slot 32 therebetween, such slot being vertically aligned with a similar slot (not shown) in table top 10. This slot may extend into the end wall portions as shown at 33.

The continuous side wall of the work holder is downwardly and inwardly inclined to aid in positioning or centering the article to be operated upon. The opposed lower wall sections are downwardly inclined towards central slot 32. When viewed from the side these lower wall sections along their inner marginal edges are curved and form substantially the arc of a circle whose center is located near pivot 21.

At their forward ends 29, i. e., toward the operator, lower wall sections 30—31 are provided with elongated slots 34 to receive the wings of the chicken to be operated upon. At their opposite ends vertical plates 35 are secured transversely in spaced relation to provide a slot 36 therebetween. These plates form a tail holder and they secure the bird in the boatlike work holder, center it in relation to travel over the saw as a unit. The bird being secured over the saw acts as a protector or guard for the operator.

Upper plate 16, which supports the work holder, has downwardly extending flanges 40 which extend transversely thereof. A bracket 41 mounted on the upper face of table top 10 and fixed in relation to plates 22 cooperates with flanges 40 to provide a stop for limited arcuate travel of the work holder or basket in either direction of travel.

The contour of lower wall sections 30—31 of the basket or work holder, when viewed from the side, corresponds generally with the contour of the back of the fowl. When the pendulous work holder is swung through an arc defined by flanges 40 encountering stop 41 the work is finished.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A cutter comprising a longitudinally slotted work holder provided with portions extending above the upper surface thereof, a frame, and pivotal means connecting said upwardly extending portions with the frame to mount the work holder for pendulous movement relative to the frame, a circular cutting element mounted for rotation on the frame and whose cutting edge extends upwardly through said slot into the work holder and means for driving the cutting element.

2. A cutter comprising a frame, a support pivotally mounted on the frame and extending downwardly from the pivot, a generally boat-shaped longitudinally slotted work holder mounted at the lower end of the support and being swingable through an arc, a circular saw mounted for rotation on the frame and whose cutting edge extends up through said slot into the work holder and means for driving the saw.

3. A carcass splitting cutter comprising a generally boat-shaped longitudinally slotted work holder provided with portions extending above the upper surface thereof, a frame, and pivotal means connecting said upwardly extending portions with the frame to mount the work holder for pendulous movement relative to the frame, stops limiting the arcuate travel of the work holder, a circular cutting element mounted for rotation on the frame and whose cutting edge extends upwardly through said slot into the work holder and means for driving the cutting element.

4. A carcass splitting cutter comprising a generally boat-shaped longitudinally slotted work holder provided with supports extending above the upper surface thereof, a frame, and pivotal means connecting said supports with the frame to mount the work holder for pendulous movement relative to the frame, the work holder having a continuous inwardly inclined side wall and a curved lower wall, a circular cutting element mounted for rotation on the frame and whose cutting edge extends upwardly through said slot in the work holder and means for driving the cutting element.

5. A carcass splitting cutter comprising a frame, an elongated, longitudinally slotted, generally boat-shaped work holder, a bracket extending above the frame and pivotal means connecting the work holder with the bracket to mount the holder for swinging movement above the table top, and a circular saw mounted for rotation on the frame and extending upwardly into the holder slot.

6. A machine for dressing fowl comprising, in combination, a table top, a bracket extending above the table top, an elongated, generally boat-shaped work holder provided with upwardly extending ears, and pivotal means connecting the upper ends of the ears and bracket to mount the work holder for pendulous movement relative to the table top, the work holder and the table top having aligned slots therein, a circular saw mounted for rotation below the table top and whose cutting edge extends upwardly through said slots, and means for driving the saw, the lower wall of the work holder having slots at one end thereof to receive the wings of the fowl, and transverse, spaced plates adjacent the other end to receive the tail of the fowl.

7. A carcass splitting cutter comprising a table top and a support for the same, an elongated, longitudinally slotted, generally boat-shaped work holder, a bracket extending above the table top and pivotal means connecting the work holder with the bracket to mount the holder for swinging movement above the table top, the lower wall of the work holder on opposite sides of the slot being curved and forming generally the arc of a circle whose center is near the pivot, the table top having a slot aligned with the slot in the work holder, and a circular saw mounted for rotation within the table top slot and extending into the holder slot.

8. A carcass splitting cutter comprising a table top, a bracket extending above the table top, an elongated, generally boat-shaped work holder and an apertured plate within which the work holder is mounted and which is provided with upwardly extending ears, pivotal means connecting the upper ends of the ears and bracket to mount the work holder for pendulous movement relative to the table top, flanges at each end of the plate and a fixed stop on the table top and having front and rear faces which are alternately engaged by one of said flanges to limit said pendulous movement, the work holder and the table top having aligned slots therein, a circular saw mounted for rotation below the table top and whose cutting edge extends upwardly through said slots, and means for driving the saw.

References Cited in the file of this patent

UNITED STATES PATENTS

| | | |
|---|---|---|
| 497,008 | Reno | May 9, 1893 |
| 995,491 | Smythe | June 20, 1911 |
| 1,472,838 | Hoyt | Nov. 6, 1923 |
| 2,169,951 | Hannan | Aug. 15, 1939 |
| 2,237,203 | Swanson | Apr. 1, 1941 |